(12) United States Patent
Bauer

(10) Patent No.: US 6,621,552 B2
(45) Date of Patent: Sep. 16, 2003

(54) FILM CAMERA WITH DATA RECORDATION

(76) Inventor: Fritz Bauer, Pummergasse 20 3002, Purkersdorf (AT)

(*) Notice: Subject to any disclaimer, the term of this patent is extended or adjusted under 35 U.S.C. 154(b) by 0 days.

(21) Appl. No.: 09/258,925

(22) Filed: Mar. 1, 1999

(65) Prior Publication Data

US 2002/0054762 A1 May 9, 2002

(30) Foreign Application Priority Data

Mar. 3, 1998 (AT) ................................ 367/98

(51) Int. Cl.[7] .............................................. G03B 31/00
(52) U.S. Cl. ........................................ 352/12; 325/25
(58) Field of Search ................................ 396/310, 311, 396/312, 315, 316, 317, 318; 352/1, 5, 11, 12, 13, 14, 15, 16, 17, 25, 29, 44

(56) References Cited

U.S. PATENT DOCUMENTS

| | | | |
|---|---|---|---|
| 2,303,181 A | * 11/1942 | Thomas ........................ | 352/22 |
| 3,591,266 A | * 7/1971 | Ried ............................ | 352/27 |
| 3,898,000 A | 8/1975 | Kogayashi et al. | |
| 3,922,076 A | 11/1975 | Schild | |
| 4,215,920 A | 8/1980 | Butler | |
| 4,218,116 A | * 8/1980 | Bauer .......................... | 352/22 |
| 4,330,183 A | * 5/1982 | Kastner ....................... | 352/206 |
| 4,832,481 A | * 5/1989 | Beauviala ..................... | 352/5 |
| 4,938,585 A | 7/1990 | Weiffenbach et al. | |
| 5,285,225 A | * 2/1994 | Blaschek et al. ............. | 352/93 |
| 5,311,228 A | 5/1994 | Stoneham et al. | |
| 5,339,123 A | * 8/1994 | Soshi et al. .................. | 396/318 |
| 5,376,961 A | 12/1994 | Galt et al. | |
| 5,500,701 A | 3/1996 | Itoh | |
| 5,504,546 A | 4/1996 | Kazami et al. | |
| 5,521,663 A | * 5/1996 | Norris, III ................... | 396/312 |
| 5,532,773 A | * 7/1996 | Shaw et al. .................. | 353/26 A |
| 5,579,066 A | 11/1996 | Miyamoto et al. | |
| 5,638,151 A | * 6/1997 | Berardi ......................... | 352/3 |
| 5,752,109 A | * 5/1998 | Saito et al. .................. | 396/311 |
| 5,877,842 A | * 3/1999 | Gibbens et al. .............. | 352/12 |
| 5,909,599 A | * 6/1999 | Ito ............................... | 396/318 |

FOREIGN PATENT DOCUMENTS

| | | |
|---|---|---|
| DE | 28 48 677 | 5/1980 |
| FR | 2 452 129 | 10/1980 |
| FR | 2 486 679 | 1/1982 |
| FR | 2 717 590 | 9/1995 |

* cited by examiner

Primary Examiner—David Gray
(74) Attorney, Agent, or Firm—Henry M. Feiereisen; Ursula B. Day

(57) ABSTRACT

A film camera is disclosed which is equipped with a device for recording synchronizing data, for use in automated post processing, wherein, for example, timing data is exposed onto the film by means of an optical display element activated by an activator unit and with a rotary shutter positioned so that at a first half rotation of the shutter the light entering through the camera objective is deflected through the viewfinder and during the second half rotation of the shutter the light enters an image window and wherein the activator unit comprises a shutter drive which controls the actuation of the shutter over which the rotating shutter is held in an arrested position covering the image window during exposure of the film by the optical display element.

11 Claims, 4 Drawing Sheets

FILM CAMERA WITH DATA RECORDATION

CROSS-REFERENCES TO RELATED APPLICATIONS

This application claims the priority of Austrian Patent Application Ser. No. A 367/98, filed Mar. 3, 1998, the subject matter of which is incorporated herein by reference.

BACKGROUND OF THE INVENTION

The present invention relates, in general, to a film camera and, more particularly to a film camera of a type having a device for recording information data, e.g. a combination of characters and/or digits, onto the film inside the film camera by exposing the film over a predetermined time period by means of an optical display element controlled by an activator.

Film cameras of this type have been in use for some time and permit recordation of synchronizing data onto the film for further processing of the film. Originally, the film industry utilized the ubiquitously known clapper boards for synchronization of image and sound.

Another proposal teaches to record synchronizing data onto the film prior to filming a film sequence, by exposing the film over a number of cadres with the synchronizing information by means of a display element built into the film camera. With these types of film cameras, the information or part thereof, normally recorded on the clapper boards, such as date, scene number or the like, is recorded in the middle of the film. After developing the film negative, the sound and image tracks can then be synchronized on the cutting table. A drawback of this procedure is the inability to infer any time-dependent reference value from the fixed character and/or number combination for use in a fully automated finishing operation of the film.

It is also known to record time-dependent synchronizing data on a separate exposure track during the entire run of the film by use of complicated auxiliary devices which are of complicated structure to realize such a projection. This results not only in high costs but requires use of significant portions of the film.

SUMMARY OF THE INVENTION

It is thus an object of the present invention to provide an improved film camera, obviating the afore-stated drawbacks.

In particular, it is an object of the present invention to provide an improved film camera which permits recordation of time information, in addition to other information, onto the film through direct exposure, without encountering any substantial loss of film material.

It is yet another object of the invention to provide a process for synchronization of a filmed sequence with the sound track by using a film camera according to the invention.

These objects, and others which will become apparent hereinafter, are attained in accordance with the present invention by providing an activator, an optical display element operated by the activator for exposing a film to form first data thereon relating to film information, and a time code generator operatively connected to the optical display element for exposing the film, cadre-by-cadre, via the optical display element to form time information, such as actual time, or time elapsed from a set zero point, or other time information, e.g. a running cadre number, thereon in directly readable or coded form.

The desired information can be recorded at the commencement of the film by placing the information centrally on the cadre, with the time code information being exposed onto each of the cadres. Recording this data onto several cadres at the start of the film suffices to create a time frame for later synchronizing the film images to the sound track during operation. The display element can thus not only provide conventional information, such as date or scene number, but also current time information so that several image cadres can be recorded with actual running time or cadre pattern.

According to another feature of the present invention, the time code generator is part of an information unit which is designed as an external module for use with the camera. Thus, the information unit can be separated from the camera, while the desired information to be exposed onto the film can be adjusted, and the time code generator can be calibrated.

To date, in order to cover the image cadre during the exposure of a film, relatively complex and costly mechanical devices were used which included a controllable cover flap and were relatively prone to failure so that situations arose in which light which enters through the camera objective overlaps the exposure of the film by the display element. This drawback can now be eliminated by providing a rotary shutter which deflects light entering the camera objective into the viewfinder when rotated by one half revolution, while allowing a passage of light to an image window when rotated by another half revolution. Suitably, the activator includes a shutter control unit for controlling the rotary shutter drive by which the rotary shutter is retained in a stop position so as to cover the image window when the film is exposed by light emanating from the optical display element. While recording time information from the optical display element onto the film, the image window is thus precisely and reliably covered.

The rotary shutter thus allows light entering through the camera objective to pass alternately during one half revolution to the viewfinder, and during another half revolution to the image window for exposure of the film. When the film transport is stopped, the rotary shutter drive is electronically so moved that the rotary shutter covers at the stop position the image window, thereby providing an unobstructed view from the viewfinder through the camera objective. Thus, when operating the activator of the film camera according to the present invention for realizing an exposure of the film by light emitted from the optical display element, the rotary shutter is previously moved into its stop position or left there to thereby reliably cover the image window. As a consequence of the precisely controllable movement of the rotary shutter, a complete coverage of the image window is assured so as to effectively avoid any overexposure which could potentially render the synchronizing information illegible. After recording the desired information onto the several cadres of the film, the process is terminated by deactivating the activator unit, while the rotary shutter is simultaneously rotated automatically in synchronism with the film transport mechanism.

According to another feature of the present invention, an exposure window, preferably of circular configuration is provided, which is offset by several cadre lengths from the image window in direction of the film transport, and through which the information indicated on the optical display element is projected onto the intermittently advancing film. Arranging the exposure window in this way, permits the recording of information onto the film away from the image window through separate exposure.

When operating the activator, the optical display element lights up with the information to be recorded precisely at the moment when the film, which passes the exposure window step-by-step, remains in the resting position between the steps. Thus, the activator and the film transport are suitably synchronized to one another.

In accordance with a further feature of the present invention, the optical display element may be designed as an active optical display element, preferably a multidigit LED display element for display of the information to be recorded onto the film. This type of LED can display the information to be recorded onto the film in random form. Other optical displays of known type that can produce suitable exposure onto a film cadre may also be utilized.

In accordance with still another feature of the present invention, a projection lens is provided in proximity to the optical display element in order to produce as clear an image as possible of the light emitted from the optical display element and projectable through the exposure window onto the film. In case of spatial constraints, a diverting prism may be interposed between the exposure window and the projection lens.

Synchronization of the image and sound tracks is of particular importance in this context and requires that the time intervals of both, image and sound, will match. For this purpose, the time code generator may thus be calibrated by a suitable time calibration unit, preferably a portable time calibration unit.

The present invention further relates to a process for recording information onto a film through exposure by using a film camera according to the present invention, whereby, it is an object of the present invention to allow recordation of time information onto a film for subsequent synchronization, without loss of any significant film material.

In accordance with the present invention, this object is attained by exposing the film, cadre-by-cadre, to form desired information thereon, such as actual time, or time elapsing from a predetermined zero point, and/or other time-dependent data, such as running cadre number, in directly readable or in coded form. Thus, time information is recorded before the start of the actual filming directly on the film and subsequently can be read during finishing procedure and internally processed by the automated processing machine.

According to another feature of the present invention, the rotary shutter can be held in place for a predetermined time period in a position covering the image window during advance of the film, cadre-by-cadre, past the image window, while the film is exposed, cadre-by-cadre, by light emitted from the optical display element. The optical display element only lights up during moments when the film, which passes intermittently past the exposure window, is held briefly in place, whereupon the next image cadre is transported in front of the exposure window, thereby realizing a precise and reliable covering of the image window for protection against incident light through the objective so as to eliminate any overexposure of information recorded by the optical display element.

According to yet another feature of the present invention, after conclusion of exposure through the display element onto the film, the rotary shutter is again rotated and synchronized with the speed of the film transport. As soon as rotary shutter and film transport speed are again synchronized, the actual film exposure may commence.

The present invention further relates to a method for synchronizing a film sequence with a sound recording by using a film camera according to the present invention, whereby it is an object to provide such a method which allows an automated processing of synchronization data in a simple manner.

In accordance with the present invention, this object is attained by providing a recordation device for exposing a film at the start of a film recordation by to form time information thereon in directly readable or machine-readable coded form on the film, developing a negative of the film, and scanning, and if necessary decoding, the time information contained in single frames on the film by a reading unit, preferably a laser scanner.

In this manner, it is possible to automatically transpose the film onto a videotape. The recorded data which is either in machine-readable code or in directly readable form, is read by means of an optical scanner, if necessary decoded, and converted in suitable form onto the videotape, whereby the correct time in relation to the sound track is automatically matched. The videotape can then be used to process the film in a fully automated manner, particularly the cutting of the film, whereby cadres to be added or to be removed are easily identified by the available time information.

According to a further feature of the present invention, when transferring the image information from the film onto the videotape, the content of the time information of each single film frame is recorded onto the time code track associated to each single frame of the videotape, and the synchronized time information is associated to each successive video image.

As soon as the film is processed completely into its electronic form, the processing information is used to process the original film negative precisely according to the recorded electronic cutting information. This process has the advantage that the very sensitive film negative can be finalized in one processing step, whereas to date, alternately editing and cutting had to be done painstakingly by manual work for each film sequence.

BRIEF DESCRIPTION OF THE DRAWINGS

The above and other objects, features and advantages of the present invention will now be described in more detail with reference to the accompanying drawing, in which.

DETAILED DESCRIPTION OF PREFERRED EMBODIMENTS

Figure 2:
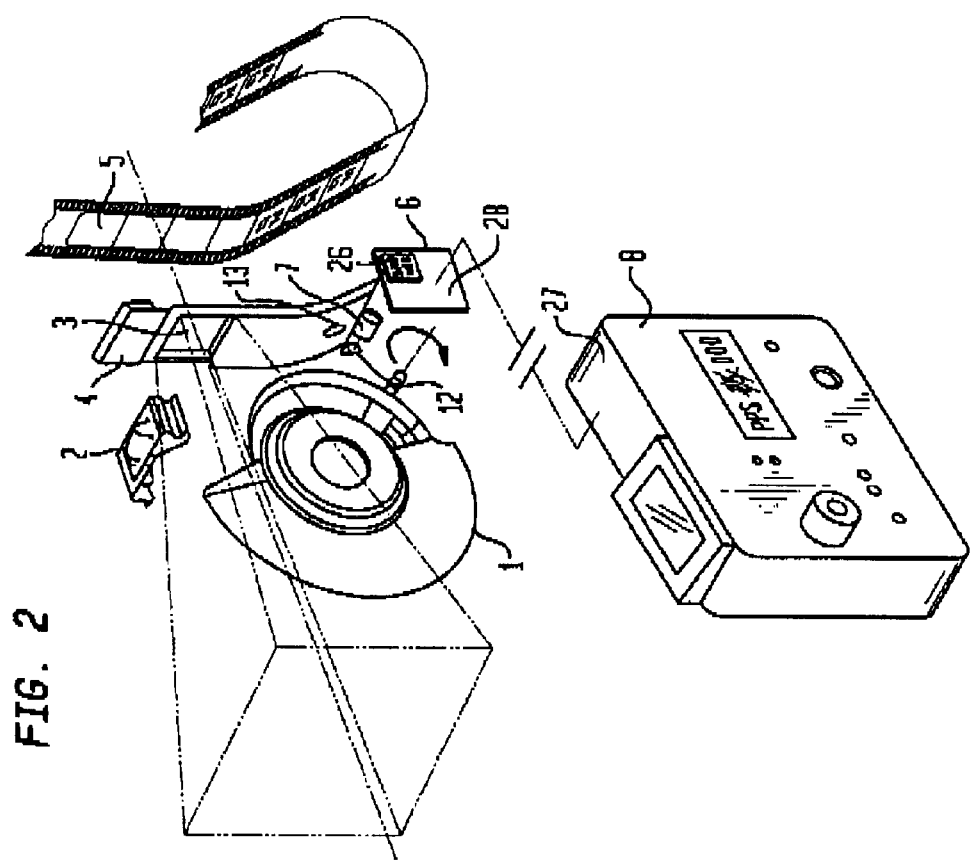
FIG. 2 is a schematic perspective illustration of the film camera of FIG. 1, with the image window being cleared.

Throughout all the Figures, same or corresponding elements are generally indicated by same reference numerals.

Figure 1:
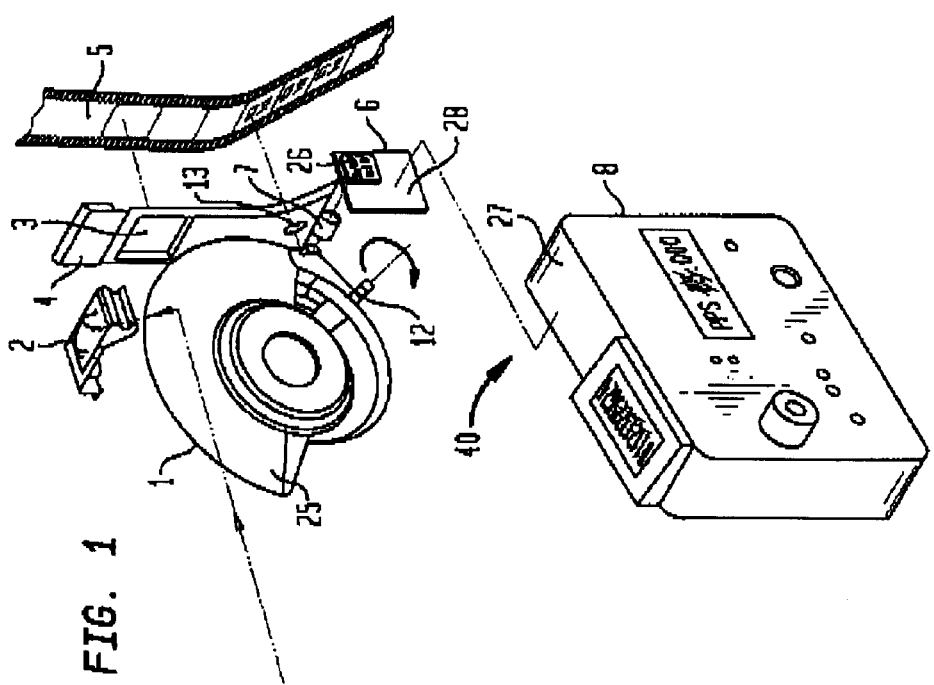
FIG. 1 is a schematic perspective illustration of a film camera, according to the present invention, with the image window being covered.

Turning now to the drawing, and in particular to FIG. 1, there is shown a schematic perspective illustration of a film camera according to the present invention. It will be appreciated by persons skilled in the art that the film camera is shown by only those components of the optical system that are relevant for the understanding of the present invention. Certainly, the film camera must have much additional apparatus which is, however, not shown in the Figures for the sake of simplicity.

Figure 3:
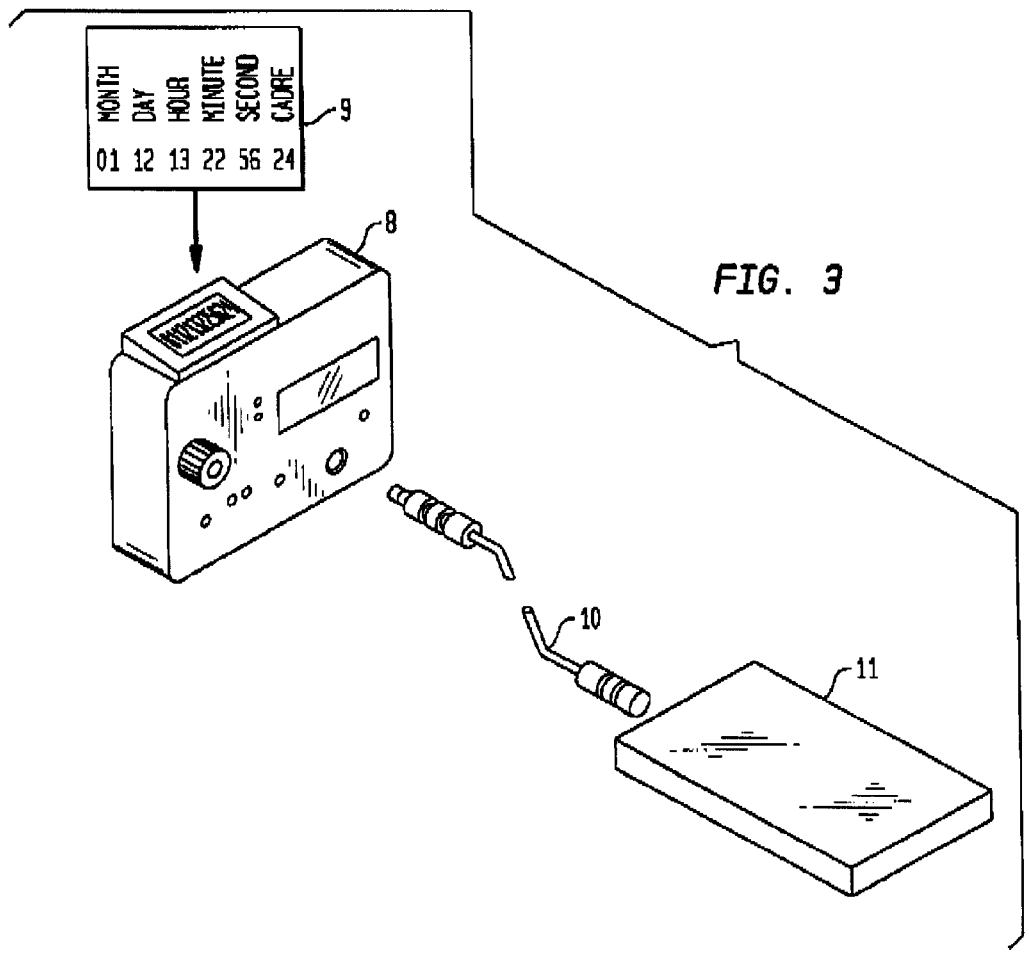
FIG. 3 is a schematic perspective illustration of a time code generator calibration unit and an information unit with time code generator for use with a film camera according to the present invention.

The film camera includes a rotary shutter 1 which is positioned in the path of light entering the camera through a camera objective (not shown). The rotary shutter 1 is tilted at an angle in relation to the optical axis of the camera and is provided with a reflecting surface 25 which is capable of deflecting light entering through the objective during one half revolution about its own axis into a viewfinder ocular 2 to thereby permit a filming, without necessitating a splitting of the light rays for the viewfinder system. In the position of FIG. 3, the rotary shutter 1 completely covers an image window 3 which is located behind the shutter 1 and is formed by a cutout in an image frame 4 so that a film 5 which is transported intermittently past the image window 3 cannot be exposed.

Figure 4:
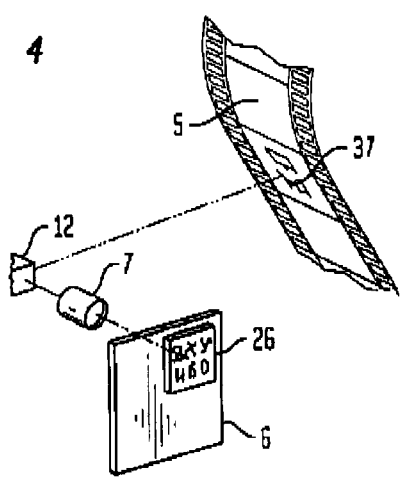
FIG. 4 is a schematic perspective illustration of recording device for use in a film camera according to the invention, shown in FIG. 1.

FIG. 4 shows the position of the rotary shutter 1 after rotation about another half revolution. In this position, light entering the camera through the objective falls onto the image window 3 and the film 5 located behind the image window 3 to expose the film to form an image to be recorded thereon.

As a result of a relatively high speed of revolution, the continuous rotation of the shutter 1 is not detectable to the human eye; Rather, the human eye perceives only a fixed natural image. The covering position of the rotary shutter 1 as illustrated in FIG. 3 occurs always during transport of the film 5, while exposure of the film 5 takes place in the "open" position of FIG. 4 after a half rotation of the rotary shutter 1 from the position shown in FIG. 3. During this half revolution, no light can enter the viewfinder ocular 2, and the film 5 occupies a stop position between transport steps realized by a suitable feeding claw system, thereby permitting a sharp image to be exposed onto the film 5.

In order to expose the film 5 to form an information thereon, e.g. a time information, at the beginning of a film sequence for subsequent synchronization, the film camera according to the present invention is provided with an information recording device, generally designated by reference numeral 40 and including an activator 6, an optical display element 26 which is operated by the activator 6, and a time code generator 27 which is operatively connected to the optical display element 26, as indicated in FIG. 1 by dashdot line. Current time information, e.g. actual time, or time elapsing from a predetermined zero point, and/or other time-dependent information, e.g. the running cadre number, is recorded onto the film 5 in directly readable form or coded form by the optical display element 26 through cadre-by-cadre exposure prior to each filmed sequence.

The activator 6 includes a shutter drive 28 for controlling a drive element (not shown) of the rotary shutter 1 and holding the rotary shutter 1 in the stop position in which the image window 3 is covered during exposure of the film 5 by the optical display element 26 to form time information on the film 5.

In order to record the desired information at the beginning of the film sequence, the rotary shutter 1 is held in place over a predetermined time period for covering the image window 3 while the film 5 moves, cadre-by-cadre, past the image window 3 and is exposed, cadre-by-cadre, by light from the optical display element 26. The predetermined time period of the shutter 1 in the stop position and the number of cadres to be exposed with information, is adjustable by the activator 6. For this purpose, a circular exposure window 13 is provided which is disposed offset by one or more cadre lengths relative to the image window 3 in the direction of film transport. Information indicated by the optical display element 26 is projected through the exposure window 13 onto the intermittently advancing film 5. It will be appreciated by persons skilled in the art that the exposure window may have a configuration other than a described circular shape. For example, the exposure window may be of rectangular shape.

In the non-limiting example of the drawing, the optical display element 26 is formed by a multi-digit LED display element for display of information to be recorded onto the film 5. Examples of such information to be recorded onto the film 5 is shown by table 9 in FIG. 3, and includes month, day, hour, minute, second and the running cadre number of each cadre appearing behind the exposure window 3, for exposure onto the film 5. An exemplified information block 37 exposed onto the film 5 is shown in FIG. 4. In order produce a sharp image of the information block 37 on the film 5, a projection lens 7 is provided via which light radiating from the optical display element 26 is projected onto film 5 through the exposure window 13. Suitably, a deviating prism 12 is disposed between the exposure window 13 and the projection lens 7 and permits space-saving disposition of the display laterally of the image frame 4.

As described above, the display element 26 is capable of exposing the film to form information thereon in a variety of forms. Depending on its optical resolution, the display element 26 may record on the film negative a wide variety of data such as any number and/or character combinations, or bar codes or the like. In particular, the display element 26 is able to expose the film 5 to form current time information thereon. Suitably, as shown in FIGS. 1 and 2, the display element 26 is operatively connected to a time code information unit 8 which includes the time code generator 27. Thus, an operator can input desired data, such as running time and/or other information into the information unit 8 for transmission to the display element 26. The information unit 8 may be designed as an external module of the film camera and is connectable thereto via a suitable plug connection. Thus, the information unit 8 can be detached from the camera and programmed separately. In this way, it is also possible, as shown in FIG. 3, to provide a time code calibrating unit 11 by which the time code generator 27 of the information unit 8 can be calibrated after a certain operating period. For calibrating purposes, the time code calibrating unit 11 is connected to the information unit 8 by a connector cable 10 (FIG. 3), and the time code generator 27 is reset to the more precise timing pattern of the calibrating unit 11.

Figure 5:
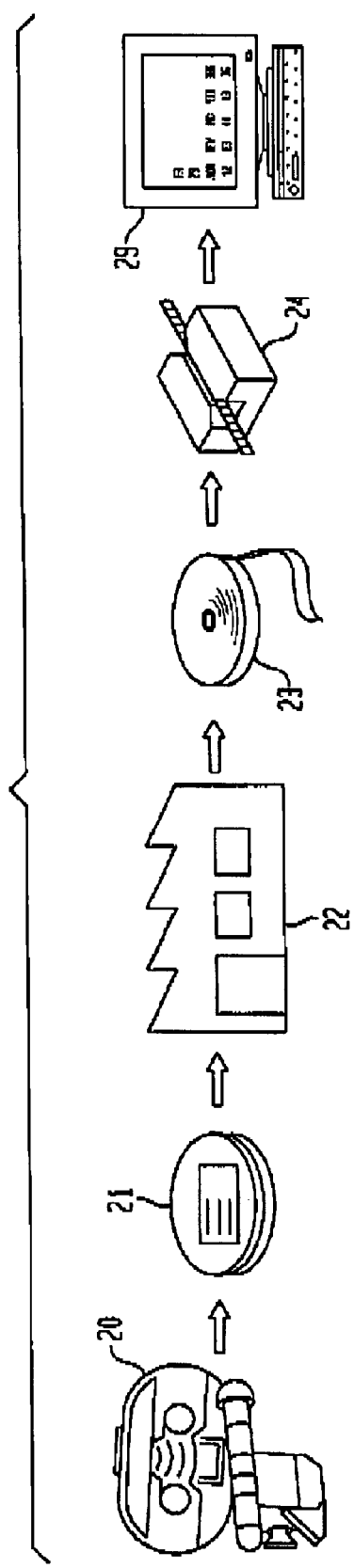
FIG. 5 is a is a flow diagram showing one embodiment of a method for synchronizing a film sequence, in accordance with the present invention.

Turning now to FIG. 5, there is shown a flow diagram for a method for synchronizing a film sequence with a sound recording, as carried out with a film camera according to the invention, and labeled by reference numeral 20. In a first step of the method, the information is recorded on the film 5 with the film camera 20 at the beginning of the recording in form of a directly readable form or machine-readable coded form. After filming, the exposed negative 21 is processed in a developing device 22 to produce a developed film negative 23. After the negative 23 is developed, the direct readable or machine-readable information, e.g. a number and/or character sequence or a bar code, included in each frame of the film negative 23 is scanned using a reading device 24, preferably a laser scanner, and, if necessary, decoded, and suitably displayed on a monitor 29. During subsequent transfer of the image information from the film 5 onto a videotape, the content of the information recorded on each frame is also recorded on the time code track of the videotape which is associated with each individual video image, and the synchronized time information is associated with each subsequent video image. Finally, the videotape is electronically processed with the synchronized time information by defining the desired scene sequences. Frames may be added or deleted, for example, during the cutting process. The resulting changes are associated with the film cadres of the developed film and transferred to the developed film during final processing of the film by, e.g., cutting and splicing. The fixed time relation between images and sound obtained with the recorded information enables complete timing correspondence even after all processing steps are completed.

Figure 6:
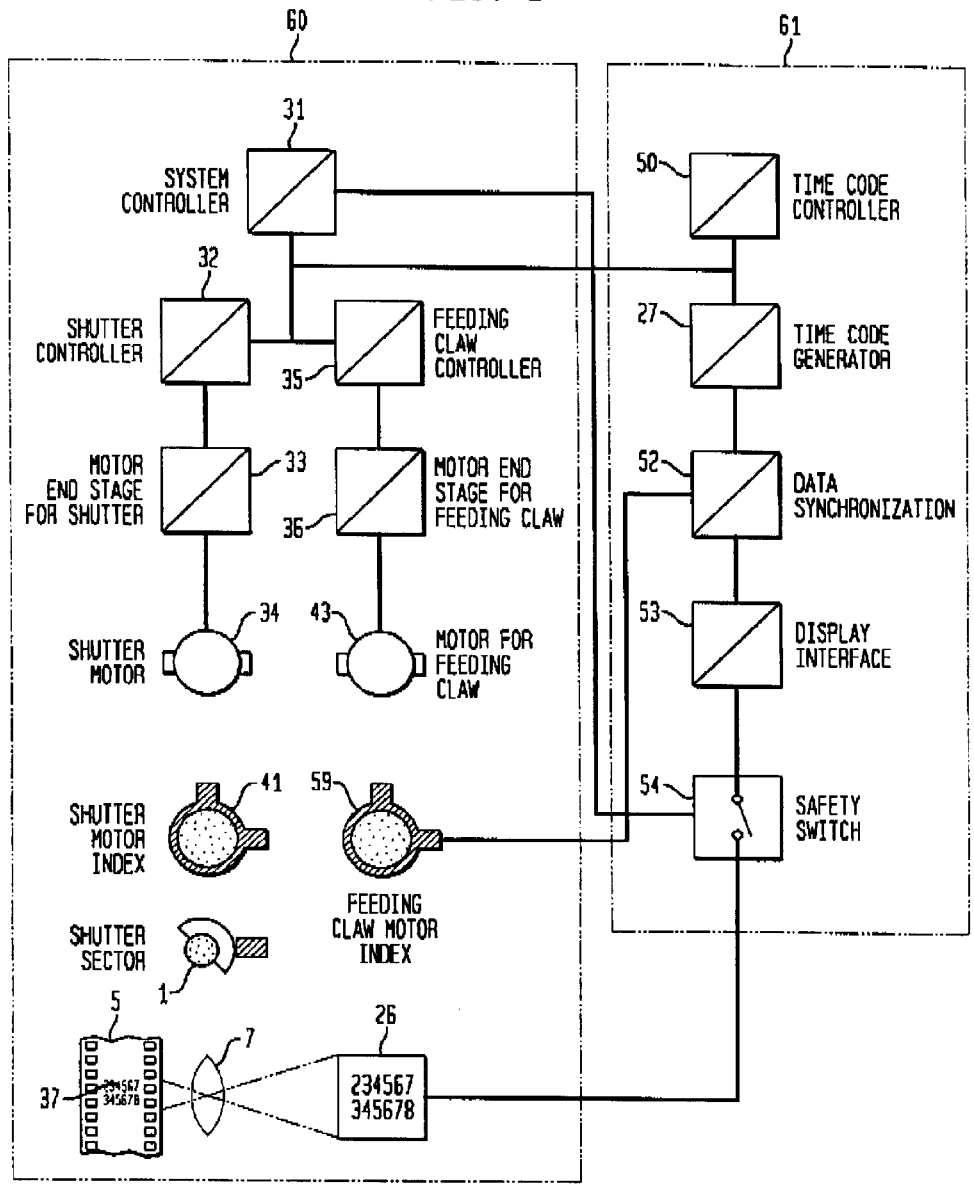
FIG. 6 is a block diagram for control of a film camera in accordance with the present invention.

Referring now to FIG. 6, there is shown a block diagram of a control system for control of a film camera in accordance with the present invention. The control system includes a first assembly 60 which contains all those components that are preferably accommodated in the housing of the camera, and a second assembly 61 which contains all those components that are accommodated in the external information unit 8. The first assembly 60 includes a system controller 31 which monitors the operation of the assemblies 60 and 61 when the information unit 8 is connected to the camera. A safety switch 54 of the assembly 61 assumes a principal function to prevent the optical display element 26 from lighting up when filming of the actual film sequences proceeds, with the projection lens 7 being illustrated between the display element 26 and the film 5 which is advanced step-by-step. For sake of simplicity, the other components, such as image frame or exposure window are not shown in FIG. 6.

The time code generator 27 produces, at least partially, the information 37 to be recorded onto film 5 and inputted by a time code controller 50. This time code information is transmitted via a data synchronizer 52 to a display interface 53 and ultimately to the display element 26, whereby the data synchronizer 52 activates the display element 26 at precisely the moment when the film 5 is held momentarily in place behind the exposure window 13 between successive steps. The data synchronizer 52 receives this synchronizing information by a feeding claw motor index 59 from which the position of the film claws is readable.

The control steps that are carried out in the assembly 60 relate to the rotary shutter 1 which is driven by a shutter drive 34 and to the feeding claw which is driven by a motor 43. As the film can be transported by means other than a feeding claw, the motor may be any suitable drive. The shutter drive 34 is driven via a shutter controller 32 and a shutter motor end stage 33, while the motor 43 is driven via a feeding claw controller 35 and a motor end stage 36, whereby the system controller 31 monitors and controls the operation of these components.

The following description refers to a possible way of recording information on the film 5; However, it will be understood that modifications may be made depending on the employed drive in the film camera or incorporated type of film transport.

Exposure of each of the cadres occurs shortly after the end of the film transport, thereby ensuring the stoppage of the film e.g. by the engaged feeding claws, with the entire exposure sequence being executed immediately after reaching the running speed of the motor 43. Only after exposing a plurality of cadres of the film 5 to form the time information and/or other information thereon, the rotary shutter 1 is rotated to run at nominal speed which is synchronized by means of shutter motor index 41 and the claw motor index 59 to the speed of the motor 34. Exposure time of the cadres depends on the sensitivity of the film material which is defined by the presetting of the film camera.

While the invention has been illustrated and described as embodied in a film camera with data recordation, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A film camera, comprising:
 information recordation means inside the camera housing for recording data onto a film during exposure of the film in the camera over a predetermined time period, said recordation means including:

an activator;

a time code generator for generating time-dependent information; and an optical display element operatively connected to the time code generator; operated by the activator for exposing a viewable area of the film, cadre-by-cadre and centrally on each cadre, via the optical display element to form time-dependent data thereon in directly readable or coded form;

an optical display projection lens for projecting radiating light from the optical display element; and an exposure window, offset from an image window of the camera and through which information indicated by the optical display element and projected by the optical projection lens is projected onto intermittently advancing film.

2. The film camera of claim 1, wherein the first data include a combination of characters and/or digits, and the second data include current time, or time elapsed from a preset zero point, and/or current cadre number.

3. The film camera of claim 1, wherein the recordation means includes an external information unit which comprises the time code generator and is inputted with information for transmission to the optical display element.

4. The film camera of claim 3, and further comprising an exposure window positioned offset in film traveling direction with respect to the image window by one or more cadre lengths for projecting information indicated on the display element onto the film traveling intermittently past the exposure window.

5. The film camera of claim 1, wherein the exposure window has a circular configuration.

6. The film camera of claim 1, wherein the optical display element is an active display element for display of information to be recorded on the film.

7. The film camera of claim 1, wherein the active display element which displays information to be projected onto the film, is a multidigit LED.

8. The film camera of claim 1, and further comprising a projection lens for projecting light radiating from the display element through the exposure window onto the film.

9. The film camera of claim 8, and further comprising a deviating prism disposed between the exposure window and the projection lens.

10. The film camera of claim 1, wherein the recordation means includes a time code calibration unit operatively connected to and calibrating the time code generator.

11. The film camera of claim 10 wherein the time code calibration unit is a portable unit.

* * * * *